Patented June 2, 1953

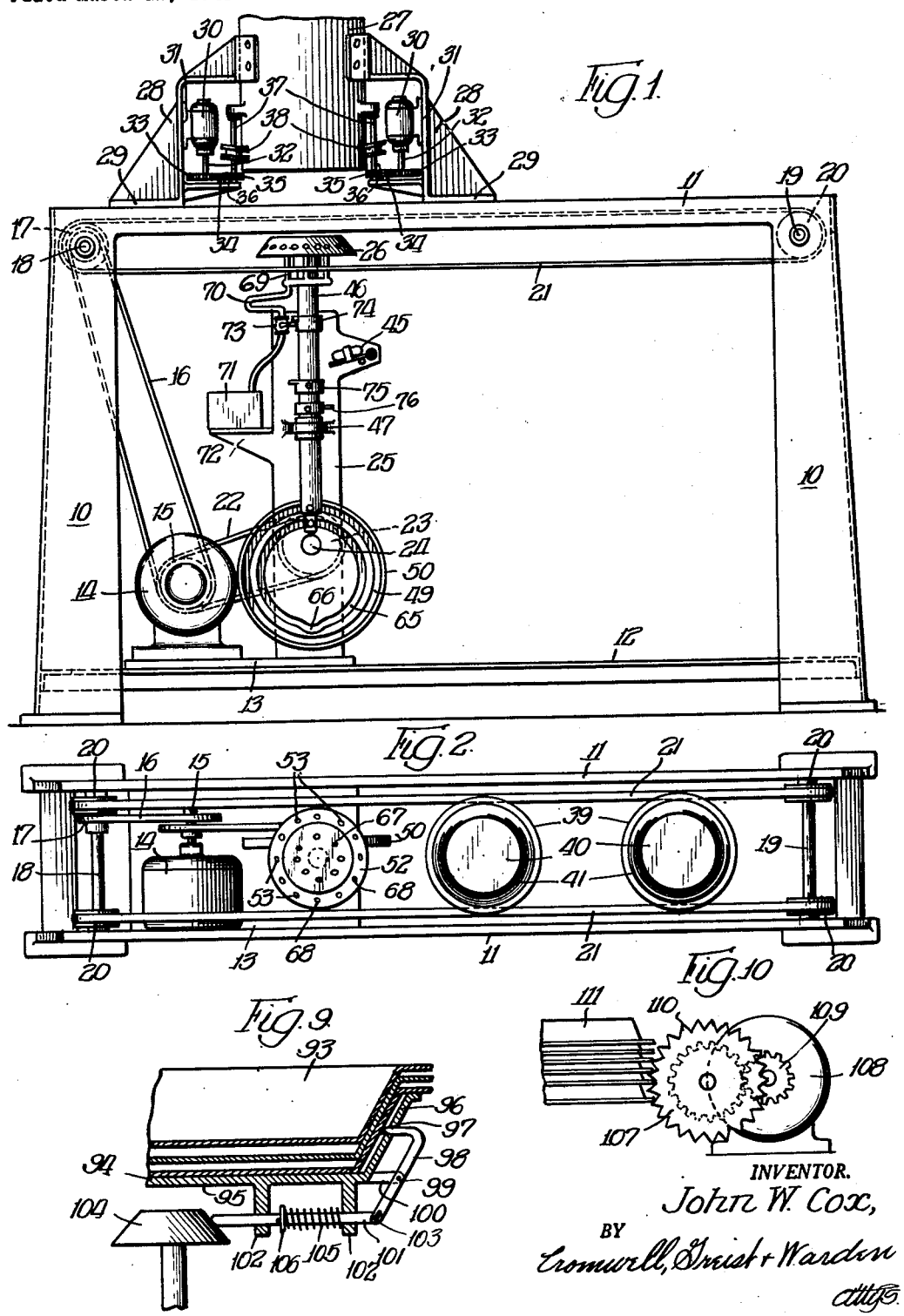

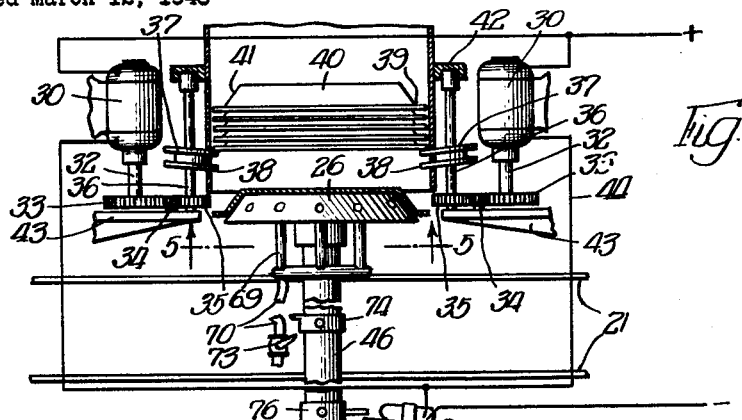

2,640,606

UNITED STATES PATENT OFFICE 2,640,606

ARTICLE SEPARATING MECHANISM

John W. Cox, Chicago, Ill., assignor to Shellmar Products Corporation, Chicago, Ill., a corporation of Delaware Application March 12, 1948, Serial No. 14,411

6 Claims. (Cl. 214—8.5)

This invention relates to an improved mechanism for separating stacked articles and is more particularly concerned with separating deep molded pulp articles such as pie plates and egg cartons of the type which are characterized by being formed with a relatively deep body portion and angularly set edge portions.

It is conventional practice to nest molded pulp articles for shipment in order to utilize smaller containers and conserve shipping space. After the molded pulp articles are formed and dried, a plurality of the articles are stacked together in nested relation and pressed into a compact bundle for shipment. This compression of the articles causes them to stick together and their separation by the user is a bothersome problem. The surfaces of the rough finished molded pulp articles inherently tend to adhere to each other and the problem of separating or unnesting such articles is thereby made more complex than in the case of similar articles which do not adhere together in this manner when they are placed in stacked relation.

The user of the molded pulp articles has heretofore unnested or separated the articles by hand with consequent irregularity in the delivery of such articles to a distributing or packing point. This has been one of the drawbacks to the greater use of the molded pulp articles such as molded pulp egg cartons in the production lines of the large output egg rooms where eggs are candled and graded and packaged in the cartons.

It is a general object of the invention to provide a mechanism for automatically separating nested articles of the type described and for delivering the articles uniformly to a production line or the like.

It is a more specific object of the invention to provide a mechanism for receiving a plurality of molded pulp articles which are in surface adhering stacked relation and for separating one by one the articles from the stack and successively delivering the same in regular timed relation to a packing station, production line or the like.

It is a still more specific object of the invention to provide a mechanism for separating nested molded pulp articles of the type which adhere together and resist separation, which mechanism comprises a fixed magazine for receiving a nested stack of the articles, a cooperating mechanism for supporting the marginal edges of the stack which is operable to separate the margins of the articles and free them for movement from the stack one by one, a reciprocating head adapted to engage the endmost article as it is freed from the stack, control means associated with the reciprocating head for holding the freed article on the head during a portion of the movement of the head and thereafter releasing the article, and a conveyor operable transversely of the path of movement of the head for removing the successive articles from the head and delivering them therefrom.

These and other objects of the invention will be apparent to those skilled in this art from a description of the machine which is illustrated by way of example in the accompanying drawings, wherein:

Fig. 1 is a side elevation of a machine embodying the principles of the invention;

Fig. 2 is a plan of the machine with the hopper and associated mechanism removed;

Fig. 3 is an enlarged section showing a portion of the operating mechanism of the machine;

Fig. 4 is a section taken on the line 4—4 of Fig. 3;

Fig. 5 is a sectional view of the reciprocating head shown in Figs. 1 and 3, taken substantially along the line 5—5 of Fig. 3;

Fig. 6 is a cross sectional view on the line 6—6 of Fig. 5;

Fig. 7 is a plan view of a modified form of the reciprocable head;

Fig. 8 is a cross sectional view of the reciprocable head shown in Fig. 7, taken on line 8—8;

Fig. 9 is a cross sectional view similar to Fig. 6 showing a further modified form of the reciprocable head; and Fig. 10 is an elevation diagrammatically illustrating a modified form of stack supporting and edge separating mechanism.

Referring to Figs. 1 to 6 of the drawings, there is illustrated a machine having incorporated therein the principles of the invention which comprises a rectangular supporting stand formed by vertical leg members 10, top side rails 11 and bottom connecting frame members 12. The bottom frame members 12 support, on a cross platform member 13, a driving motor 14 having a double sheave drive pulley 15.

The pulley 15 is connected by a driving belt 16 with a pulley 17 on the shaft 18 which is journaled in one end of the supporting stand. A parallel shaft 19 is journaled in the other end of the supporting frame. Pairs of pulleys 20 adjacent the ends of shafts 18 and 19 carry a pair of spaced parallel belts 21 which cooperate to form an endless conveyor.

The drive pulley 15 on the motor 14 is connected by a belt 22 with a pulley 23 on a cam shaft 24 which is supported transversely of the machine by a cross frame structure 25. The cross frame 25 also supports an unnesting head 26 which will be subsequently described.

A magazine or article receiving compartment 27 is supported on the top side rails 11 by means of brackets 28 projecting upwardly from cross members 29. The brackets 28 are arranged in opposed relation on opposite sides of the magazine 27.

A pair of synchronous motors 30 are supported on vertical portions 31 of the brackets 28. The motors 30 are provided with drive shafts 32 and pinions 33 which are connected by suitable gearing 34 with drive pinions 35 on the shafts 36 of rotatable stack supporting and article separating members 37.

Each of the members 37 is provided with a spiral rib 38 projecting a sufficient distance within the magazine 27 to engage in supporting relation the marginal flange portions 39 of nested articles 40 which are arranged therein.

For the purposes of illustration the articles 40 are shown as molded pulp pie plates having a substantial depth and characterized by outwardly sloping side wall portions 41 terminating in the marginal flanges 39. As shown in Fig. 3 the pie plates 40 are positioned in the magazine 27 in inverted relation with the marginal flanges 39 of the lower endmost plate resting on the spiral ribs 38 of the supporting and separating members 37. The spiral ribs 38 on the members 37 are so constructed that when rotated to release or separate the endmost pie plate from the stack they support the remainder of the stack by engagement of their upper portions with the flange or flanges on the pie plates immediately above the released one.

The members 37 may be mounted in bearing brackets 42 or supported in any other conventional manner. The gearing 34 may be supported on a flange 43 extending inwardly from the brackets 28. The motors 30 are connected by appropriate electrical wiring 44 with a source of electric energy and a mercury switch 45 is provided in the circuit 44 for controlling the operation of the motors 30.

The unnesting head 26 is mounted for vertical movement on a rod or reciprocating member 46. The rod member 46 is slidably supported in a bracket 47 extending from the cross frame 25. At its lower end the member 46 is provided with a cam roller 48 (Fig. 4) which travels in the outer cam track 49 of a double track face cam 50 mounted on the driven cam shaft 24.

The unnesting head 26 comprises a flat top portion 51 and a peripherally extending conical side wall portion 52. The exterior of the unnesting head is the same general contour as the interior or dish portion of the pie plate 40.

The conical side wall portion 52 of the head 26 is provided with a plurality of peripherally spaced apertures 53 (Fig. 2 and 5). A plurality of relatively small rods or pins 54 are mounted by means of pairs of spaced depending brackets 55 within the head 26 for movement in a radial direction, each pin 54 being aligned with an aperture 53 in the side wall 52 of the head and being urged in retracted position by means of a spring 56 which engages the outer bracket 55 at one end and at the other end a collar 57 fixed on the pin 54 in spaced relation to the inner bracket 55. The outer ends of the pins 54 are preferably sharpened or pointed at 58 (Fig. 6) to provide a relatively sharp article engaging edge.

The inner ends 59 of the pins 54 are rounded and adapted to engage a conical cam member 60 which is mounted on a vertical rod 61 movable in the bore 62 of the head supporting rod 46. The lower end 63 of rod 61 projects beyond the lower end of the rod 46 (Fig. 4) and is provided thereon with a cam roller 64 which rides in the inner cam track 65 on the face cam 50. The cam tracks 49 and 65 are concentric for a major portion of their path with a portion 66 of the track 65 approaching the track 49 to give the conical cam member 60 a limited upward movement relative to the head 26 at the point where the head 26 reaches its uppermost limit of movement.

The top portion 51 of the head 26 is provided with a plurality of apertures 67 (Fig. 2) arranged intermediate the radially extending pin members 54. The side wall portion 52 is provided with a plurality of apertures 68 which are arranged intermediate the apertures 53 and in approximate radial alignment with the apertures 67 in the top portion 51. The apertures 67 and 68 are connected by appropriate pipe lines 69 with a flexible hose 70. The hose 70 is connected to a vacuum pump 71 or the like and the latter is supported by a bracket 72 from the cross structure 25.

The hose 70 is supplied with a cut-off valve 73 and the vertical member 46 is provided with a pair of projecting valve actuator members 74 and 75 which are adapted to open and close the cut-off valve 73. The members 74 and 75 are mounted on the member 46 so that they may be moved vertically. These members are adjusted so that when the head 26 reaches the limit of its upward movement for engagement with the endmost pie plate 40 the valve 73 is opened by the member 75 and when the head 26 has moved downwardly away from the magazine 27 to a point where the flange 39 of the pie plate 40 rests on the belt members 21 the valve 73 is shut by the member 74 to relieve the vacuum and release the pie plate 40 from the head 26.

The head carrying member 46 is provided with an adjustably mounted trip or operating member 76 (Figs. 1 and 3) for actuating the mercury switch 45. The trip 76 is adjusted on the member 46 so that the motors 30 operate the article releasing members 37 to free the endmost pie plate 40 as the unnesting head 26 reaches the limit of its upward movement. The switch 45 is preferably the type which is automatically reset after a predetermined operation of the motors 30. The motors 30 are rotated sufficiently to turn the members 37 the necessary amount to completely free the endmost pie plate 40.

In operating the illustrated machine the magazine 27 is loaded with a stack of pie plates 40 with the margin 39 of the lower or endmost pie plate resting on the spiral ribs 38 of the stack supporting and releasing members 37. The motor 14 is actuated to drive the belt 22 and the cam shaft 24. Rotation of the face cam 50 on the cam shaft 24 causes the unnesting head 26 to move upwardly into engagement with the endmost pie plate 40 as the latter is released by operation of the motors 30 controlled by the switch 45, the latter being operated by the trip 76 as the member 46 moves upwardly. When the head 26 reaches its upper limit of movement the valve 73 is actuated by the member 75 to make the vacuum mechanism effective through the apertures 67 and 68. As the head 26 reaches the upper limit of its movement the conical cam member 60 is moved upwardly relative to the head 26 by the cam 50. The pins 54 are moved outwardly to project the sharpened ends 58 into engagement with the inner surface of the side wall 41 of the pie plates 40. The lowermost pie plate 40 is then held on the head 26 by the engagement of the pins 54 and by the vacuum operating through the apertures 67 and 68. Continued rotation of the cam 50 causes the member 46 to move downwardly carrying the head 26 between the endless belt members 21. As the head 26 reaches the plane of the upper run of the belt members 21 bringing the flange 39 of the pie plate 40 into engagement with the belts 21 the trip member 74 closes the valve 73 and releases the vacuum. At this point the conical cam 60 is retracted to permit the springs 56 to withdraw the pins 54 from engagement with the side wall 41 of the pie plate 40. Continued downward movement of the head 26 permits the belt members 21 to move the pie plate 40 out of the path of movement of the head 26. Repeated operation of the mechanism in this manner provides a continuous supply of the nested articles on the belt members 21 which may deliver them to a work station for further use.

A modified form of the unnesting head is shown in Figs. 7 and 8. In this form the head 77 is supported on a vertically reciprocating rod member 78 and is provided on its top 79 with a series of apertures 80 and on its conical side wall 81 with a series of apertures 82 in general radial alignment with the apertures 80. The apertures 80 are connected by suitable pipe 83 with a hose 84 extending to a vacuum pump 85. The hose 84 is provided with a cut-off valve controlled by a pinion 86 which is operated by a rack bar 87. The rack bar 87 forms the movable portion of the solenoid 88 which is actuated by a micro switch diagrammatically illustrated at 89. A cutout switch 90 is supported for operation by a trip member 91 adjustably secured on the rod member 78 and connected in a suitable electrical circuit 92 for disabling the solenoid 88.

In a machine equipped with the modified form of head 77 the operation is the same as in the form of machine shown in Figs. 1 to 6 except for the movable pins 54 and their operating mechanism which have been eliminated. The solenoid 88 opens the cut-off valve controlled by pinion 86 when the mercury switch 89 engages the endmost article in the stack and applies the vacuum through the apertures 80 and 82 to hold the article on the head 77. As the head 77 moves down the cut-out switch 90 is actuated by the member 91 at the proper point in the path of movement to release the article from the head 77 for delivery by the belt members 21.

In Fig. 9 there is illustrated a further modification of the unnesting head which is applicable for use in removing from a stack articles 93 which may be of the same nature as the pie plates 40 but which are stacked in reverse arrangement. The head 94 comprises a bottom 95 and an upwardly and outwardly sloping side wall 96. The side wall 96 is provided with a series of spaced apertures 97 for receiving article engaging members 98 which are mounted for movement inwardly of the head 94. The members 98 are pivoted at 99 on projecting brackets 100 and are operated by radially directed rods 101 which are supported by depending brackets 102. The outer end of each rod 101 is connected by a pivot pin and slot at 103 to a member 98 while the inner end of the rod 101 engages a conical operating cam 104. A spring 105 abuts at one end against the outer bracket 102 and at the other end against a fixed collar 106 on each rod 101 tending to urge the rod 101 inwardly and to move the member 98 into non-engaging relation with the articles.

In a machine provided with the head 94 the operation will be the same as in the other forms described. The head 94 will move upwardly to receive the endmost pie plate 93 as it is released from the stack and the members 98 will be operated by cam 104 to embed the sharpened ends thereof in the surface of the wall of the pie plate. When the head 94 is moved downwardly the members 98 will be retracted to release the pie plate for removal by the endless conveyor.

In Fig. 10 there is illustrated a modified form of supporting and releasing mechanism for the stack of articles. In this mechanism a toothed wheel 107 is driven by a synchronous motor 108 through appropriate gearing 109. The wheel 107 is provided with spaced teeth 110 which are located relative to the article receiving magazine so that they engage between the edges of the stacked articles 111 and upon rotation release the endmost article in a manner similar to the spiral supporting members 37.

While specific materials and details of construction have been referred to in describing the mechanism which has been shown for the purpose of illustration, it will be understood that other materials and other details of construction may be resorted to within the spirit of the invention.

I claim:

1. In a machine of the class described, means for receiving a stack of molded pulp articles which have relatively deep body portions and angularly set edge portions and which are in surface adhering nested relation, means cooperating with said stack receiving means for successively separating the margins of endmost articles and freeing such articles for movement from the stack, means to grasp the endmost article as it is freed by said margin separating means and to withdraw said freed article in a direction away from the stack, said last mentioned means including elements which are adapted to engage with and pierce the surface of said article, and means to remove the successive articles from said last mentioned means whereby said articles are successively unnested and removed from said stack.

2. In a machine of the class described, means for receiving a stack of nested molded pulp articles, means associated with said stack receiving means to marginally engage endmost articles in the stack and separate the same for removal from the stack receiving means one at a time, means to internally grasp the endmost article and to withdraw the same in a direction away from the stack holding means, said last mentioned means including outwardly projectible elements having sharpened ends adapted to imbed themselves in the material of the molded pulp articles to assure a firm grasp thereof, and means to retract said elements from article grasping position after removal of the article from the stack whereby the articles are successively separated and removed from the stack receiving means.

3. In a machine of the class described, receiving means for a stack of nested molded pulp articles, means associated with said receiving means for marginally separating endmost articles in the stack to permit their removal from the stack one at a time, means to internally grasp the endmost article and withdraw the same from the stack as it is released by said marginally separating means, said last mentioned means comprising a movable head shaped to conform generally to the contours of the article, intermittently operating vacuum means on said head for holding the article on the head until the head has been removed a predetermined distance to separate the article from the stack and thereafter releasing the article for removal from the head and movable holding elements on said head for engagement with said article, said elements having sharpened portions adapted to imbed in the surface of the article.

4. A machine for successively separating articles which have upstanding side walls and which are stacked in nested relation so that they cling together, said machine comprising a hopper for receiving a stack of the nested articles, means rotatable about fixed axes adjacent the discharge end of said hopper for supporting the stack, and operable simultaneously to successively force the end article out of clinging engagement with the stack to permit its removal therefrom, a reciprocable head, means for operating said head and said stack supporting means in timed relation to position said head at one end of its movement in engagement with the end article as the end article is disengaged from said stack and released by said stack supporting means, and means on said head for internally gripping said article and for holding the article in engagement therewith during a predetermined portion of the return movement of said head, said last mentioned means comprising suction elements and cooperating radially projectable elements engageable with the side walls of said article.

5. In a machine for individually separating stacked molded pulp articles which articles are characterized by upstanding side walls and peripheral flanges extending outwardly therefrom, said machine having rotatable means engageable with the flanges of the endmost articles of the stack to support the stack and simultaneously to force successive end articles away from the stack for movement therefrom, a reciprocable head movable to receive the successive articles as they are forced from the stack, said head having a contoured upper surface corresponding substantially to the downwardly facing surface of the article, radially projectable pointed elements on said head to grip the side walls of the successive articles as they are forced from the stack to retain the same thereon for a predetermined portion of the reciprocating movement and means for operating said pointed elements to release the articles and permit their removal from said head.

6. In a machine of the class described, means for receiving a stack of molded pulp articles which have relatively deep body portions and angularly set edge portions and which are in surface adhering nested relation, means cooperating with said stack receiving means for successively separating the margins of the endmost articles and freeing such articles for movement from the stack, means to grasp the endmost article as it is freed by said margin separating means and to withdraw said freed article in a direction away from the stack, said last mentioned means including a reciprocating head having vacuum means for retaining said article thereon and also having pointed elements movable outwardly into embedding engagement with the body portion of said article to insure a firm grasp thereof, means for operating said vacuum means and said movable elements to release said article from said head upon predetermined movement of said head.

JOHN W. COX.

References Cited in the file of this patent

UNITED STATES PATENTS

| Number | Name | Date |
|---|---|---|
| 1,095,319 | Erwin | May 5, 1914 |
| 1,408,617 | McDonald et al. | Mar. 7, 1922 |
| 1,634,566 | Wessman | Apr. 3, 1923 |
| 1,722,048 | Hill | July 23, 1929 |
| 1,817,387 | McCrery | Aug. 4, 1931 |
| 1,849,148 | Mojonnier | Mar. 15, 1932 |
| 1,864,008 | Wright et al. | June 21, 1932 |
| 1,945,846 | Adams | Feb. 6, 1934 |
| 1,964,823 | Knowlton | July 3, 1934 |
| 1,979,089 | Adams | Oct. 30, 1934 |
| 2,279,420 | Thum | Apr. 14, 1942 |
| 2,281,725 | Snyder | May 5, 1942 |
| 2,318,132 | Welk | May 4, 1943 |
| 2,390,298 | Glassner | Dec. 4, 1945 |
| 2,433,736 | Carew | Dec. 30, 1947 |
| 2,445,713 | Glassner | July 20, 1948 |